(12) United States Patent
Fraga

(10) Patent No.: US 10,383,484 B2
(45) Date of Patent: Aug. 20, 2019

(54) SLOPED SHOWER TILING FRAME

(71) Applicant: Raul Fraga, Miami, FL (US)

(72) Inventor: Raul Fraga, Miami, FL (US)

( * ) Notice: Subject to any disclaimer, the term of this patent is extended or adjusted under 35 U.S.C. 154(b) by 24 days.

(21) Appl. No.: 15/844,193

(22) Filed: Dec. 15, 2017

(65) Prior Publication Data

US 2018/0192830 A1 Jul. 12, 2018

Related U.S. Application Data

(60) Provisional application No. 62/444,305, filed on Jan. 9, 2017.

(51) Int. Cl.
*A47K 3/40* (2006.01)
*A47K 3/16* (2006.01)
*E03F 5/04* (2006.01)

(52) U.S. Cl.
CPC .............. *A47K 3/16* (2013.01); *A47K 3/40* (2013.01); *E03F 5/0408* (2013.01)

(58) Field of Classification Search
CPC . A47K 3/16; A47K 3/40; E03F 5/0407; E03F 5/0408

USPC ............................................................ 4/612
See application file for complete search history.

(56) References Cited

U.S. PATENT DOCUMENTS

| | | | | |
|---|---|---|---|---|
| 5,140,789 A * | 8/1992 | De Gooyer | ............... | A47K 3/40 4/613 |
| 6,088,984 A * | 7/2000 | Kirby | ...................... | E04F 15/00 404/2 |
| 2010/0000169 A1 * | 1/2010 | Grave | ...................... | A47K 3/40 52/302.1 |

* cited by examiner

*Primary Examiner* — Huyen D Le
(74) *Attorney, Agent, or Firm* — CIONCA IP Law P.C.; Marin Cionca

(57) ABSTRACT

A frame having a slope for supporting tiles of a shower floor, having: a plurality of slats in a grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor.

16 Claims, 20 Drawing Sheets

SLOPED SHOWER TILING FRAME

CROSS-REFERENCE TO RELATED APPLICATIONS

This application claims the benefit of U.S. Provisional Application No. 62/444,305, filed Jan. 9, 2017, which is hereby incorporated by reference, to the extent that it is not conflicting with the present application.

BACKGROUND OF INVENTION

1. Field of the Invention

The invention relates generally to tiling and more specifically to drainage of water in showers.

2. Description of the Related Art

In many showers, water accumulates on the floor tiles of the shower before draining. The water accumulation causes growth of mold and bacteria, which can be a health hazard. It can be difficult and time consuming to alter a shower to ensure that water drains quickly without accumulating on the floor. Renovations or alterations to a shower can be particularly difficult if large tiles are needed. Large tiles may be difficult for users to install, and may prevent fast drainage of water into the drain of the shower floor if the tiles are not placed at the proper angles for flow of water into the drain. Users installing or modifying their shower may also need to create a pre-slope to prevent water from pooling, which could cause the aforementioned problems of mold, bacteria, and so on. Creating a pre-slope may be difficult for users, particularly for inexperienced users. There may be difficulties with creating the sloped surface from, for example, deck mud, which can be a time-consuming process. Therefore, there is a need for a quick, easy, and effective method of modifying or installing a shower such that water drains quickly without pooling.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a frame having a slope for supporting tiles of a shower floor is provided, the frame comprising a plurality of slats in a lattice grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor. An advantage is that the user may easily be provided with a pre-slope without the need to create one from deck mud, mortar, or other similar materials, to fit their shower. Another advantage is that tiles sloped towards the drain are easy to install and the frame and tiling may be customized for any size shower.

In another aspect, a method of tiling a shower floor using a frame having a slope for supporting tiles is provided, the frame comprising a plurality of slats in a grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor; the method comprising the steps of: measuring the dimensions of the shower floor, lining the shower floor with a waterproof shower pan liner, providing the frame, sized to match the measured dimensions of the shower floor, installing the frame having a slope onto the waterproof shower pan liner, aligning the slope with the drain of the shower floor, such that the drain hole is positioned substantially near the drain, positioning the tiles on the frame, at least some of the tiles aligning with the guide rails, marking positions of the tiles relative to each other on the frame, removing the tiles from the frame, laying down a substrate for adhering the tiles to the frame, and installing tiles on top of the frame according to the marked positions. Again, an advantage is that the user may easily be provided with a pre-slope without the need to create one from deck mud, mortar, or other similar materials, to fit their shower. Again, another advantage is that tiles sloped towards the drain are easy to install and the frame and tiling may be customized for any size shower.

In another aspect, a method of making a frame having a slope for supporting tiles of a shower floor is provided, the frame comprising a plurality of slats in a grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor; the method comprising the steps of: measuring dimensions of the shower floor, marking a position of a drain within the dimensions of the shower floor, providing the frame, cutting the frame to match the measured dimensions, cutting a drain hole into the frame at the marked position of the drain, the drain hole being sized to fit substantially around the drain, aligning the slope with a drain of the shower floor, such that a pre-slope is created in the shower floor, cutting the frame into a plurality of frame pieces, attaching a post to at least a first frame piece of the plurality of frame pieces, and cutting a hole for receiving the post in at least a second frame piece of the plurality of frame piece. Again, an advantage is that the user may easily be provided with a pre-slope without the need to create one from deck mud, mortar, or other similar materials, to fit their shower. Again, another advantage is that tiles sloped towards the drain are easy to install and the frame and tiling may be customized for any size shower.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
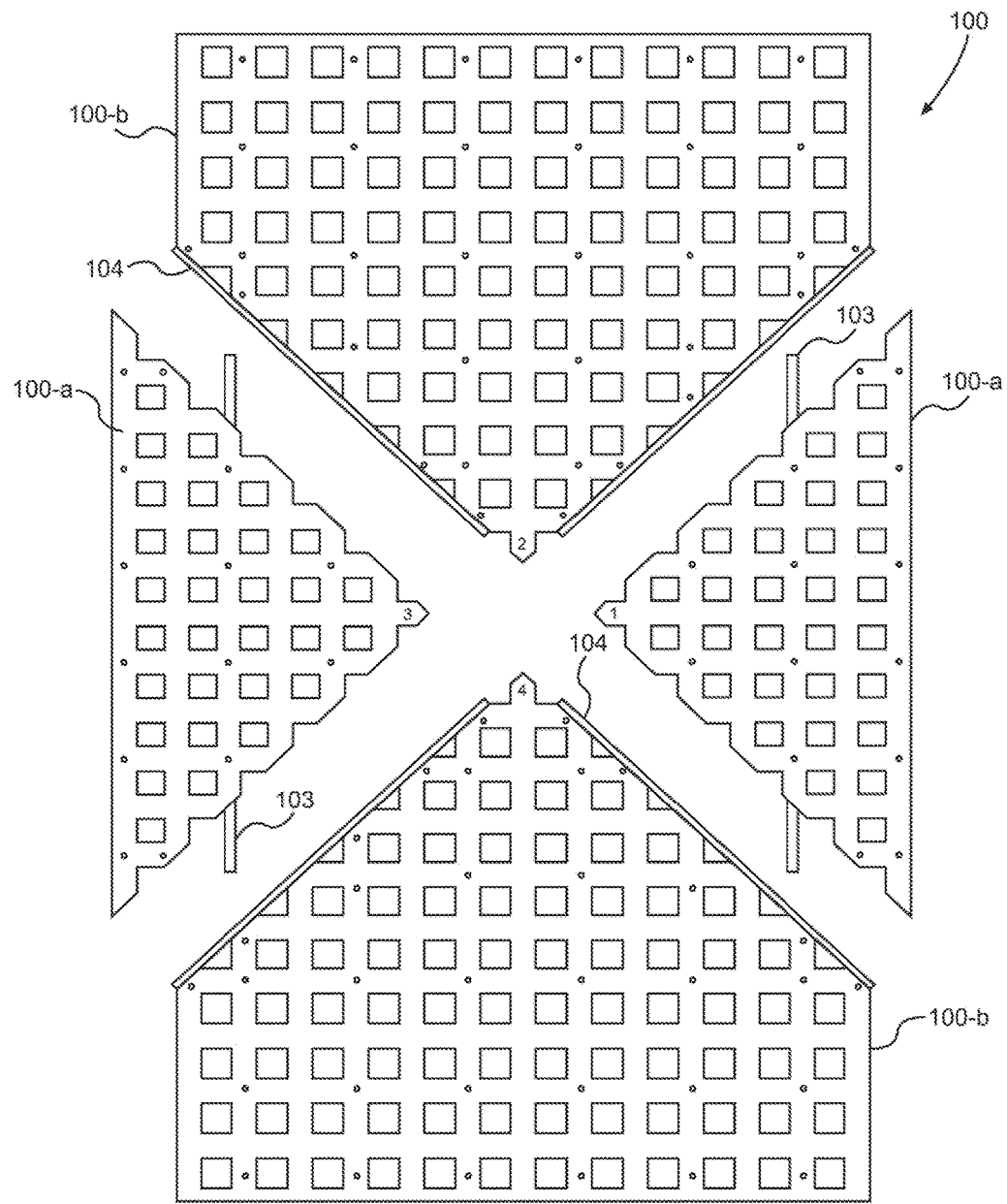
FIG. 1 shows the top view of a sloped frame for tiling a shower floor, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 100 and 300, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 shows the top view of a sloped frame ("sloped frame," or "frame,") for supporting tiles for finishing a shower floor, according to an aspect. The frame may be constructed from pieces, such as the four pieces as shown by 100-a and 100-b in the example, or the frame may be provided as a single integral unit. The frame may be customized or resized to fit any size of shower, and any placement of the drain in the floor of the shower. The frame may be constructed from plastic, or plastic with aluminum, or any other suitable materials. The frame may also include guide rails 104 constructed from aluminum, metal, or any other suitable materials. The guide rails 104 may be located on at least one edge of at least one piece of the plurality of frame pieces, for receiving an edge of another frame piece, for ease of connection of the frame pieces together and for guiding the placement of tiles during the tiling step of finishing the shower floor. The guide rails may ensure that the tiles placed onto the frame are uniformly level with one another. A frame that is constructed of multiple pieces may be assembled and fitted together to be custom sized for a shower by fitting the pieces together using posts 103 inserted into the other pieces, for example. At least one frame piece may be provided with a post 103, and at least a second frame piece may be provided with a hole for receiving the post, such that the frame pieces may be connected together. The frame pieces may also be provided with any suitable securing means to hold the pieces together once the post is inserted into the hole of the second frame piece. As an example, the frame pieces may be provided as male and corresponding female pieces such that the frame pieces may interlock and be secured together, and be released and disconnected by the push of a button. The frame pieces may also be engaged into a locked position or disengaged to be disconnected by other suitable means. As shown, the frame may be composed of slats in a lattice grid formation, wherein the framework is open and holes are provided within the lattice structure. The strips or slats provided within the frame may cross each other to provide holes. An advantage may be that the frame 100 may be lightweight and thus easy for the user to manage or carry. Another advantage may be that the holes may allow for a user to bypass the skip of waiting for cement below the frame to dry before moving on to the step of applying cement on top of the frame for installing the shower tiles (further discussed when referring to FIGS. 9-10B). The strips or slats and guide rails, posts, and other components may be constructed from any suitable waterproof material. The frame may also be constructed and later cut to size to fit any suitable shower or any other area where water drainage is needed.

Figure 2A:
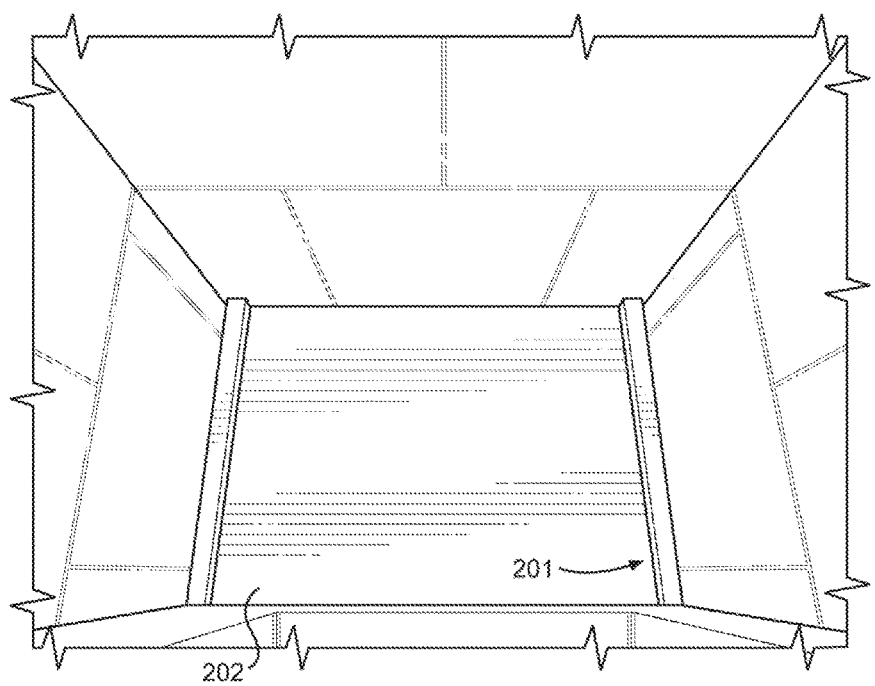
FIGS. 2A-2B show step 1 of an exemplary method of using a sloped frame for tiling a shower floor, showing the top view of a shower floor prepared with a shower pan liner, according to an aspect.
Figure 2B:
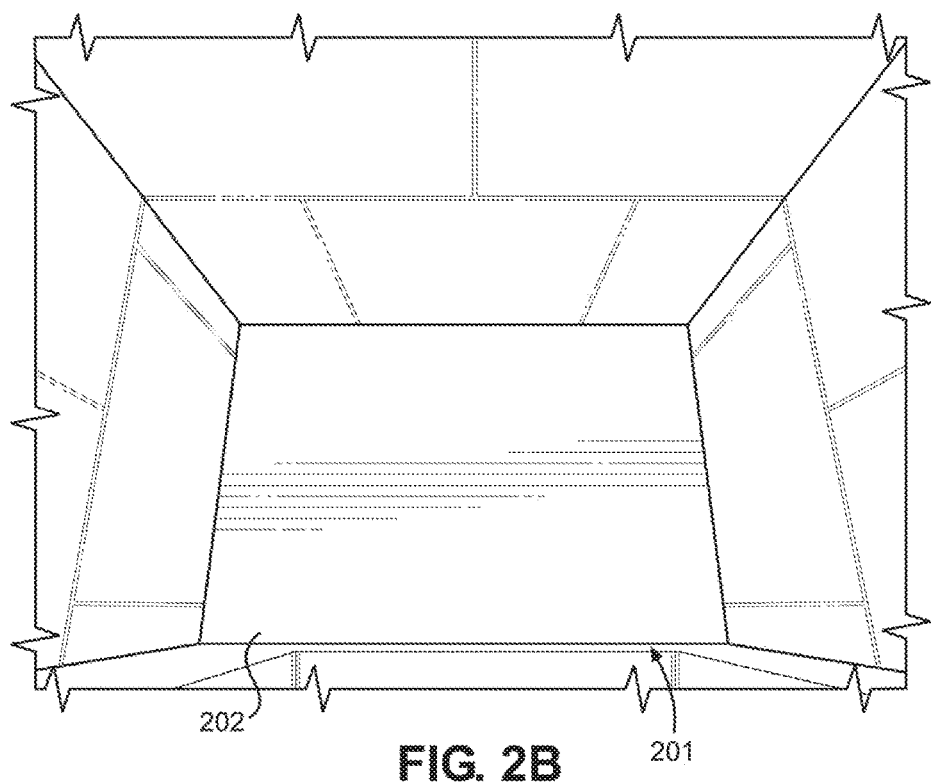

FIGS. 2A-2B show step 1 of an exemplary method of using a sloped frame for tiling a shower floor 201, showing the top view of a shower floor prepared with a shower pan liner 202, according to an aspect. FIG. 2A shows a detailed view, and FIG. 2B shows a top view of a shower floor with a PVC shower pan liner, according to an aspect. To install a shower floor with a slope leading towards a drain, first, any suitable waterproof lining or membrane may be installed as known in the art. The shower pan liner 202 may be, as shown as an example, PVC, or any other suitable material. The liner 202 may be placed underneath the frame, according to a process for installing tiles as known in the art.

Figure 3:
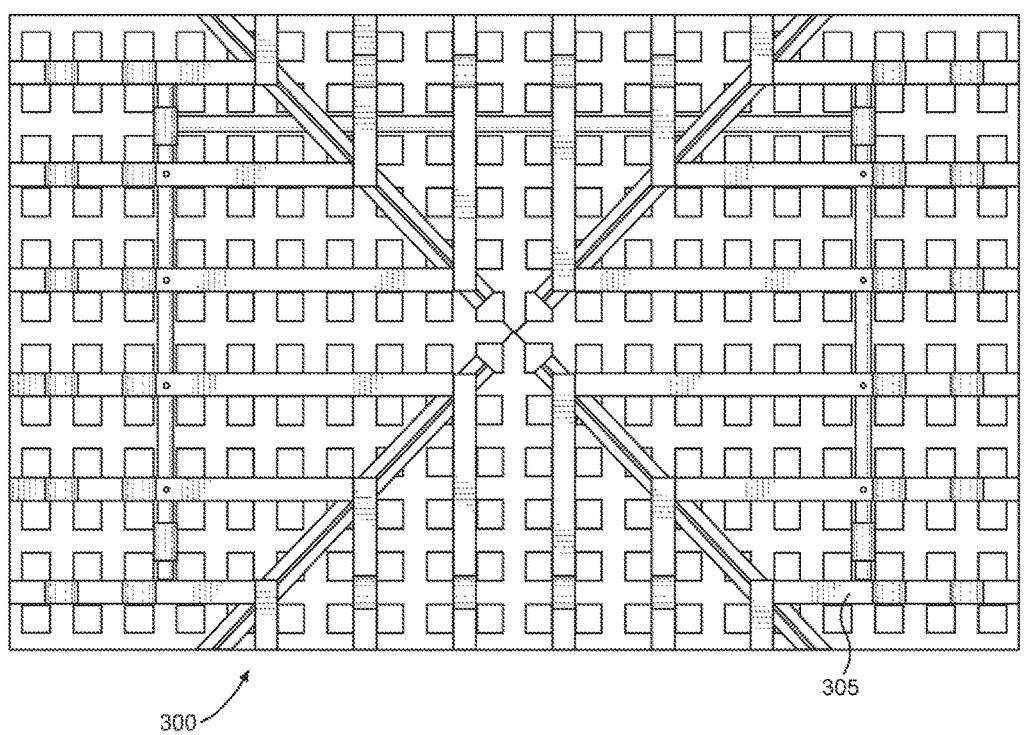
FIG. 3 shows step 2 of an exemplary method, showing the bottom view of a frame assembled and sized to fit a shower floor, according to an aspect.

FIG. 3 shows step 2 of an exemplary method, showing the bottom view of a frame 300 assembled and sized to fit a shower floor, according to an aspect. The frame 300 may rest on plastic supports 305, to sit with a gap above the surface of the shower floor when installed.

Figure 4:
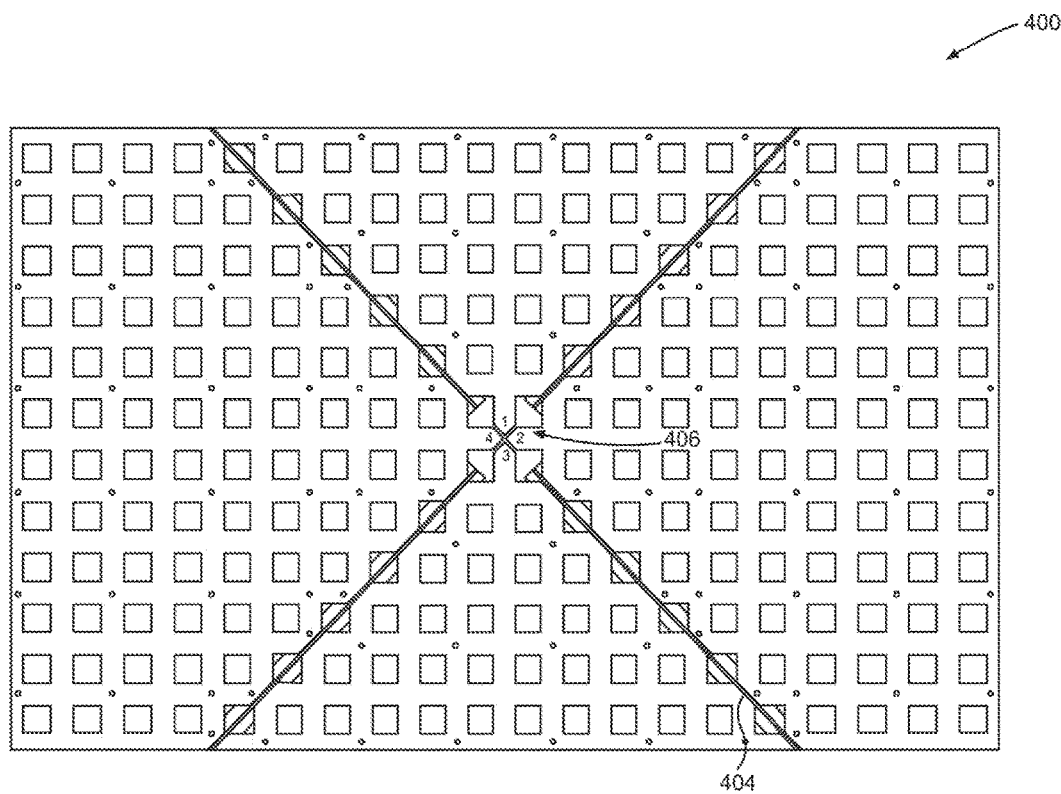
FIG. 4 shows step 3 of an exemplary method, showing the top view of a frame assembled and labeled with numbers for organizing the placement of tiles, according to an aspect.

FIG. 4 shows step 3 of an exemplary method, showing the top view of a frame 400 assembled and labeled with numbers 406 for organizing the placement of tiles, according to an aspect. When assembled, the rails 404 may be raised above the top of the frame, such that the tiles that are placed on top may be slightly separated from one another when meeting at the middle of the frame and to ensure that adjacent tiles are uniformly level with one another, for the uniform flow of water towards the drain.

Figure 5A:
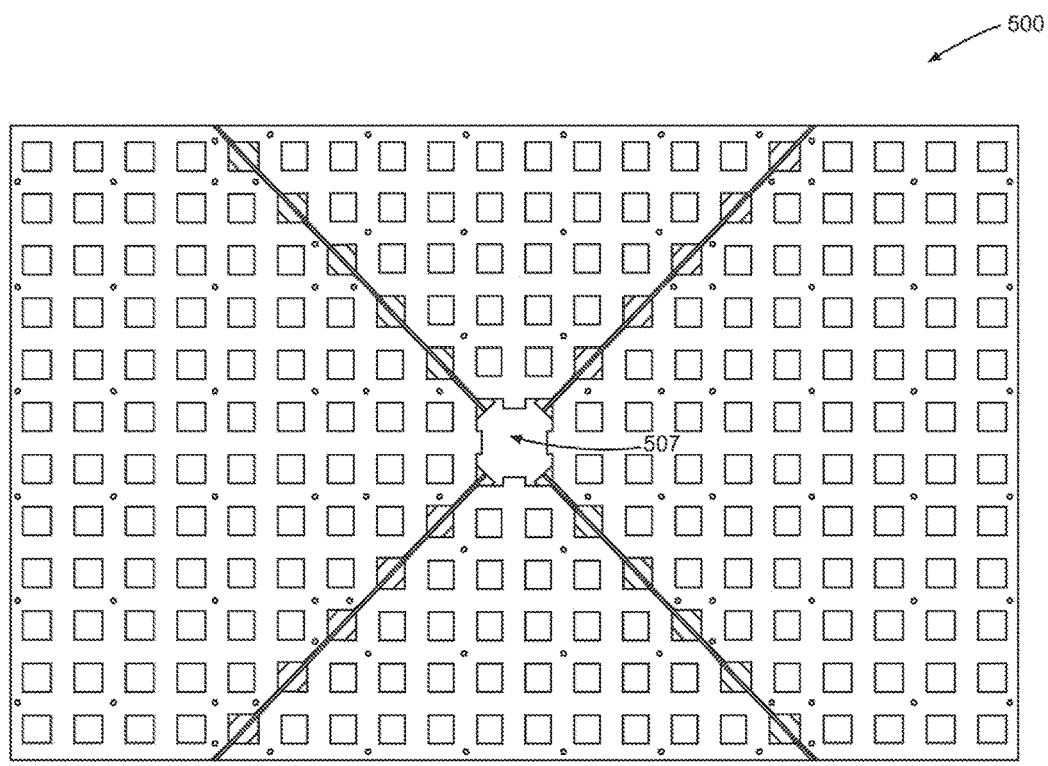
FIG. 5A shows step 4 of an exemplary method, showing the top view of a frame assembled and with a hole cut at the center of the frame for a drain, according to an aspect.

FIG. 5A shows step 4 of an exemplary method, showing the top view of a frame 500 assembled and with a hole 507 cut at the center of the frame for a drain, according to an aspect. The frame 500 may be custom cut and sized for any shower, and any placement of a drain.

Figure 5B:
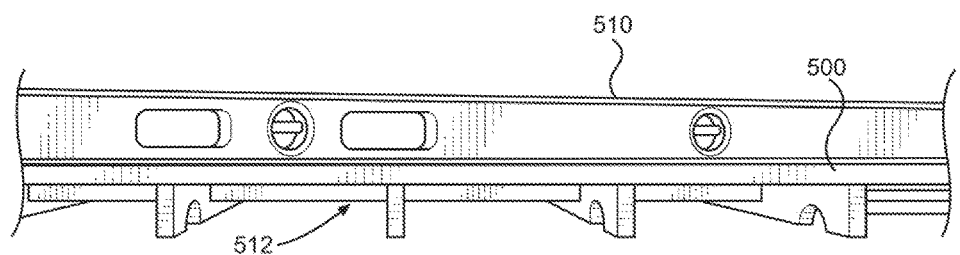
FIGS. 5B-5C show side elevation views of an example of an assembled frame, according to an aspect.
Figure 5C:
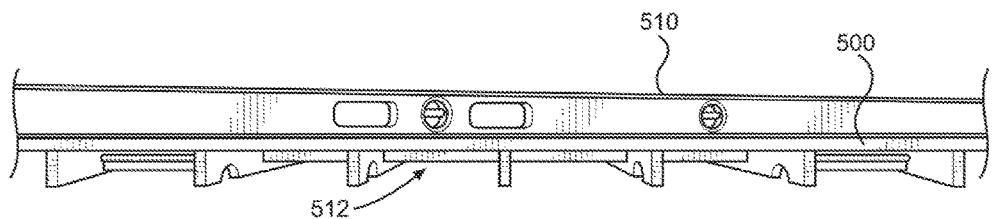

FIGS. 5B-5C show side elevation views of an example of an assembled frame 500, according to an aspect. With respect to a level 511, the slope 512 of the frame 500 may be seen. The frame 500 may have a higher portion and a lower portion to create the slope, and the drain hole (as shown by 507 in FIG. 5A) may be located at the lower portion of the frame. The lower portion may be at the center of the frame for a shower floor that has a drain at the center of the floor, or the lower portion may be at an end of the frame for a shower floor having a drain at an end of the floor, for example. Thus, the frame may slope downwards towards its center, or the frame may slope downwards towards one end. The slope 512 created by the frame 500 may allow water to quickly flow towards the drain, and the slope provided by the frame may reduce the need for wait time in between steps of tiling a shower floor. As an example, use of mortar for creating a pre-slope and waiting for the mortar to dry may be eliminated.

Figure 6:
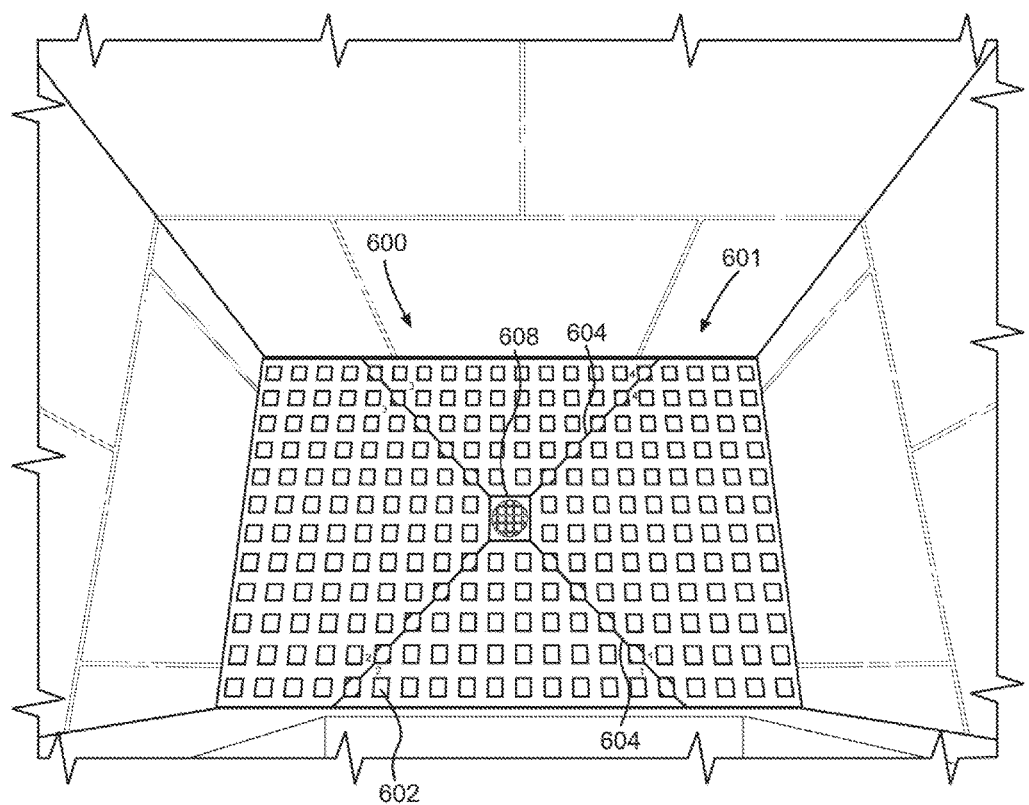
FIG. 6 shows step 5 of an exemplary method, showing the top view of a frame placed onto a shower floor, according to an aspect.

FIG. 6 shows step 5 of an exemplary method, showing the top view of a frame 600 placed onto a shower floor 601, according to an aspect. The frame 600 may be custom cut such that the slope of the frame leads towards the drain 608, and the hole at the center of the frame is sized to fit substantially around the drain of the shower floor. The rails 604 of the frame may meet at the center, at the drain, such that the tiles placed on top are spaced apart and may be provided with a guide for placement. A shower pan liner 602 may be visible through the holes of the frame 600.

Figure 7:
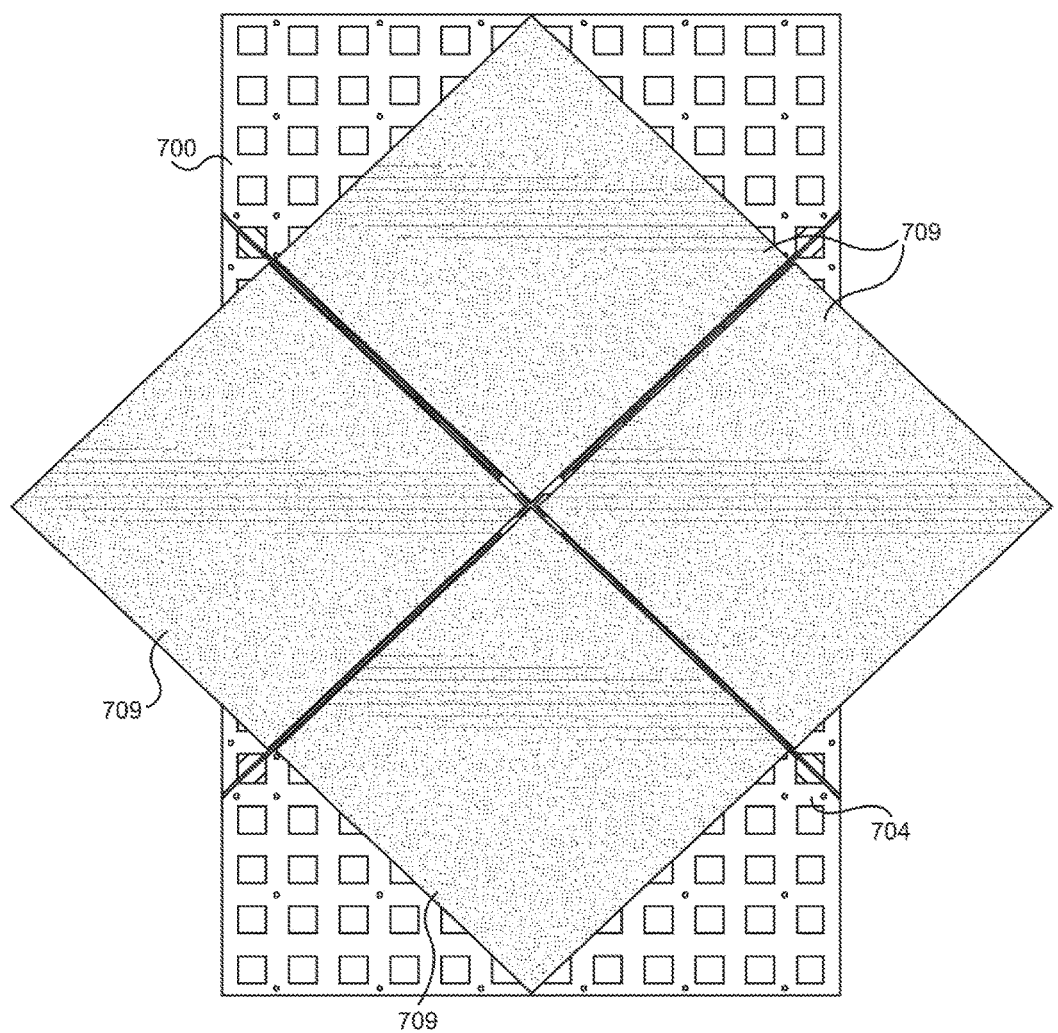
FIG. 7 shows step 6 of an exemplary method, showing the top view of tiles placed on top of a frame, according to an aspect.

FIG. 7 shows step 6 of an exemplary method, showing the top view of tiles 709 placed on top of a frame 700, according to an aspect. As an example, tiles 709 may be placed onto the frame 700 before installing the frame into the shower, such that the overall placement may be predetermined, and that oversized tiles or tiles that do not fit within the shower may be placed onto the frame and then cut down to size. The tiles 709 may be slightly spaced apart from each other where they meet at the center of the frame by rails 704. Large, small, or any suitable size of tiles may be used with the frame 700 and may be easily installed by the user, due to the guides provided by the frame for a uniform flow of water towards the drain. The frame may allow for the tiles to level perfectly at their joints for uniform water flow.

Figure 8A:
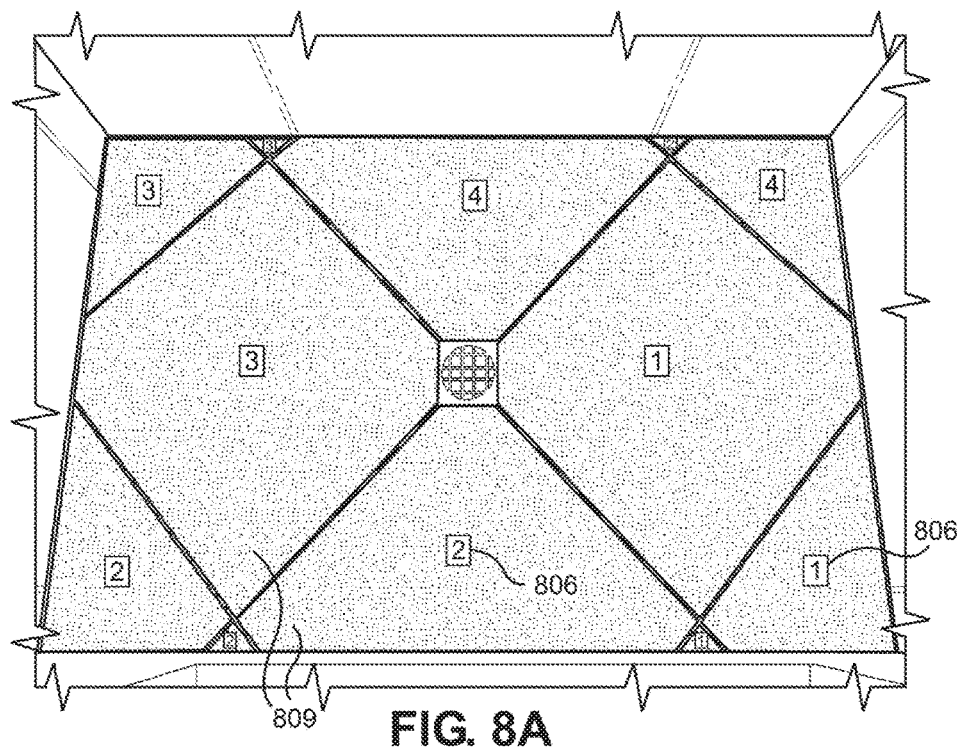
FIGS. 8A-8B show another view of step 6 of an exemplary method, showing the top view of tiles placed on top of a frame, according to an aspect.
Figure 8B:
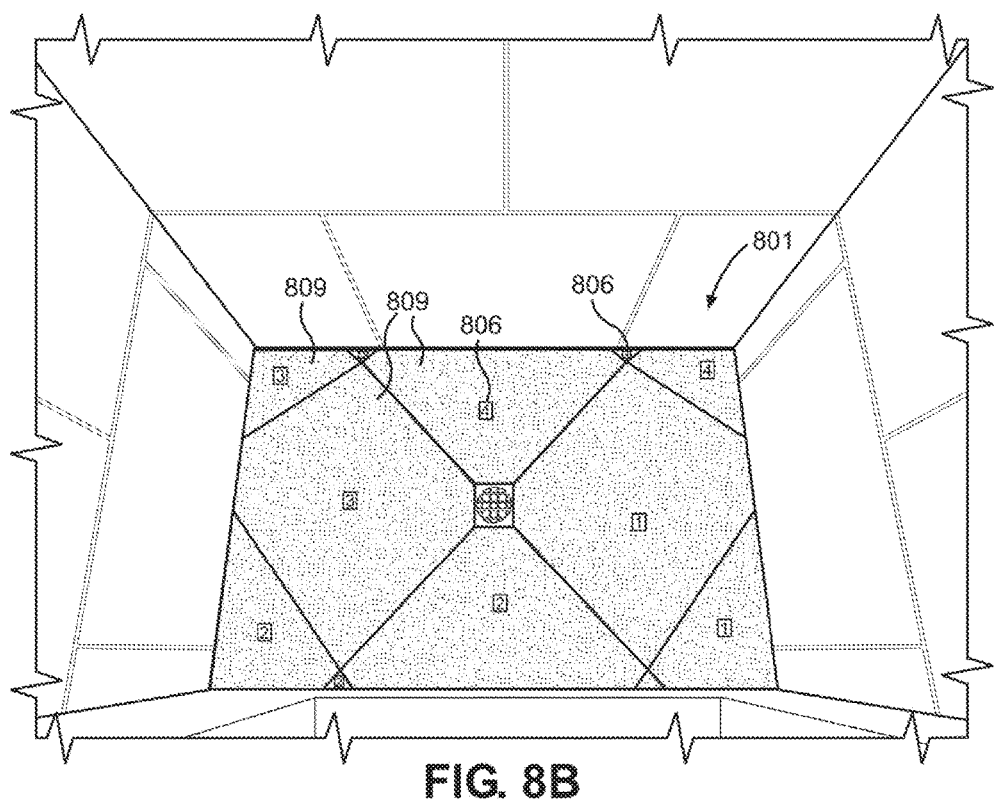

FIGS. 8A-8B show another view of step 6 of an exemplary method, showing the top view of tiles 809 placed on top of a frame (not visible), according to an aspect. FIG. 8A shows a detailed view, and FIG. 8B shows a top view of a shower floor with tiles overlaid on the frame (not visible), according to an aspect. As an example, tiles 809 may be placed on a frame directly in the shower to be tiled, and may be numbered (as shown by number markers 806) to keep track of the placement of each tile. Thus, the tiles may be taken off of the frame such that glue and other materials may be laid down.

Figure 9:
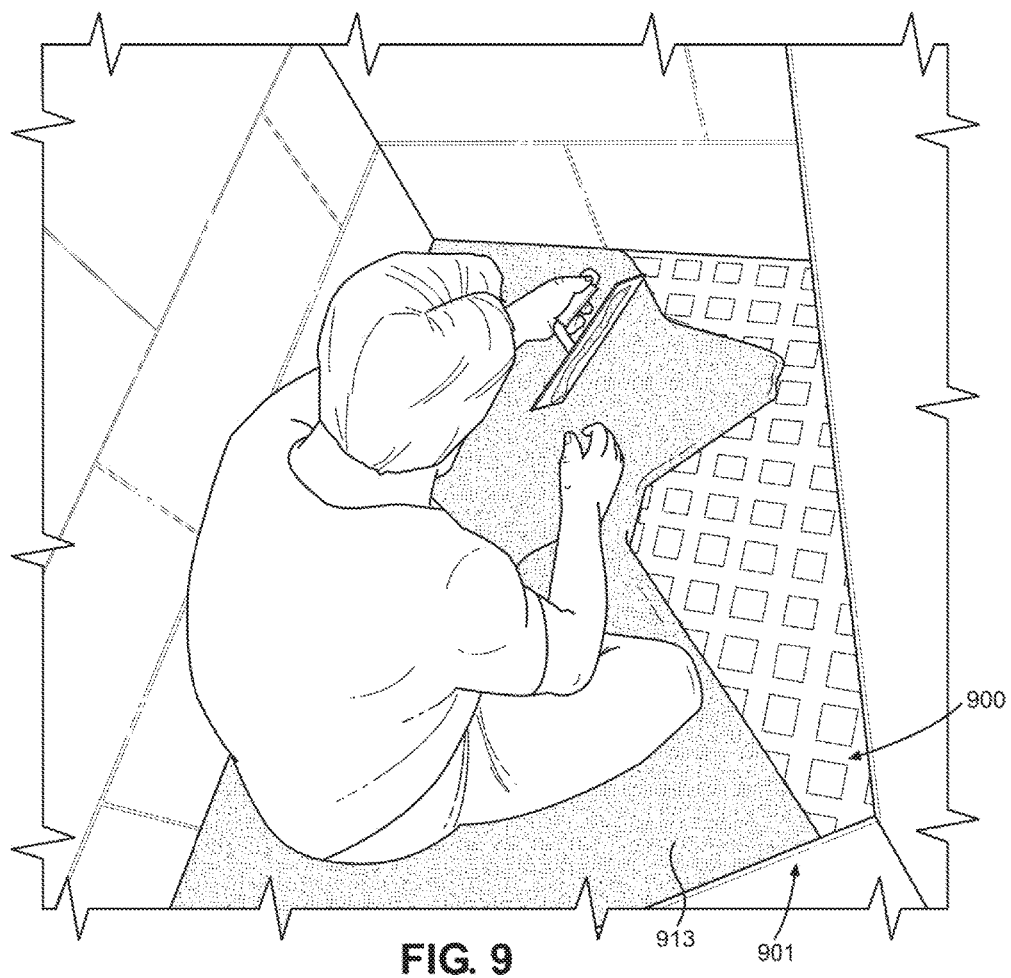
FIG. 9 shows step 7 of an exemplary method, showing the top perspective view of laying down an underlying substrate for tile installation, according to an aspect.

FIG. 9 shows step 7 of an exemplary method, showing the top perspective view of laying down an underlying substrate for tile installation, according to an aspect. After laying down the frame 900 on the shower floor 901, a mortar 913 such as, for example, thinset mortar may be spread over the frame 900. Once finished, the frame and the mortar may be sturdy enough such that the frame with mortar may be walked on. As an example, the latticework frame having holes may be advantageous due to allowing the user to first apply a mortar or cement below the frame, and without the need to wait for the cement to dry, proceed to the step of applying cement on top of the frame, for the placement of the shower tiles (as shown in FIGS. 10A-10B).

Figure 10A:
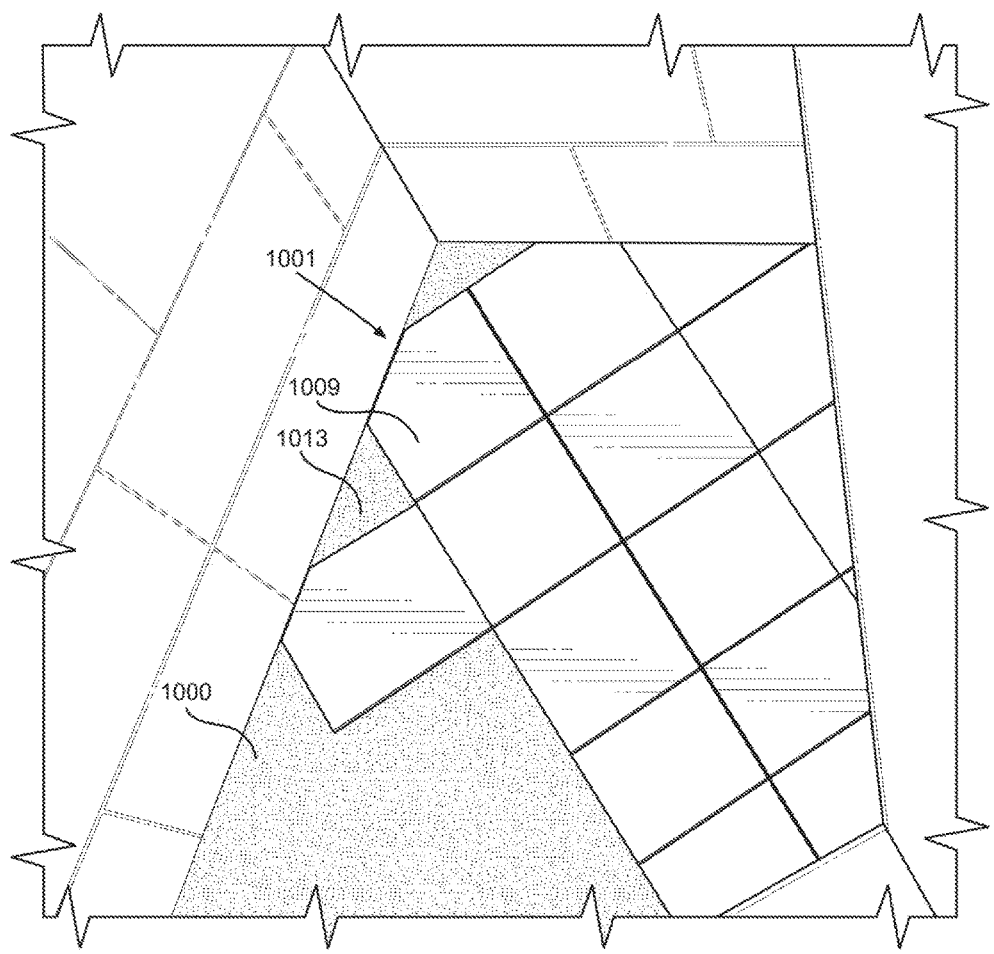
FIGS. 10A-10B show step 8 of an exemplary method, showing the top perspective view of installing tiles, according to an aspect.
Figure 10B:
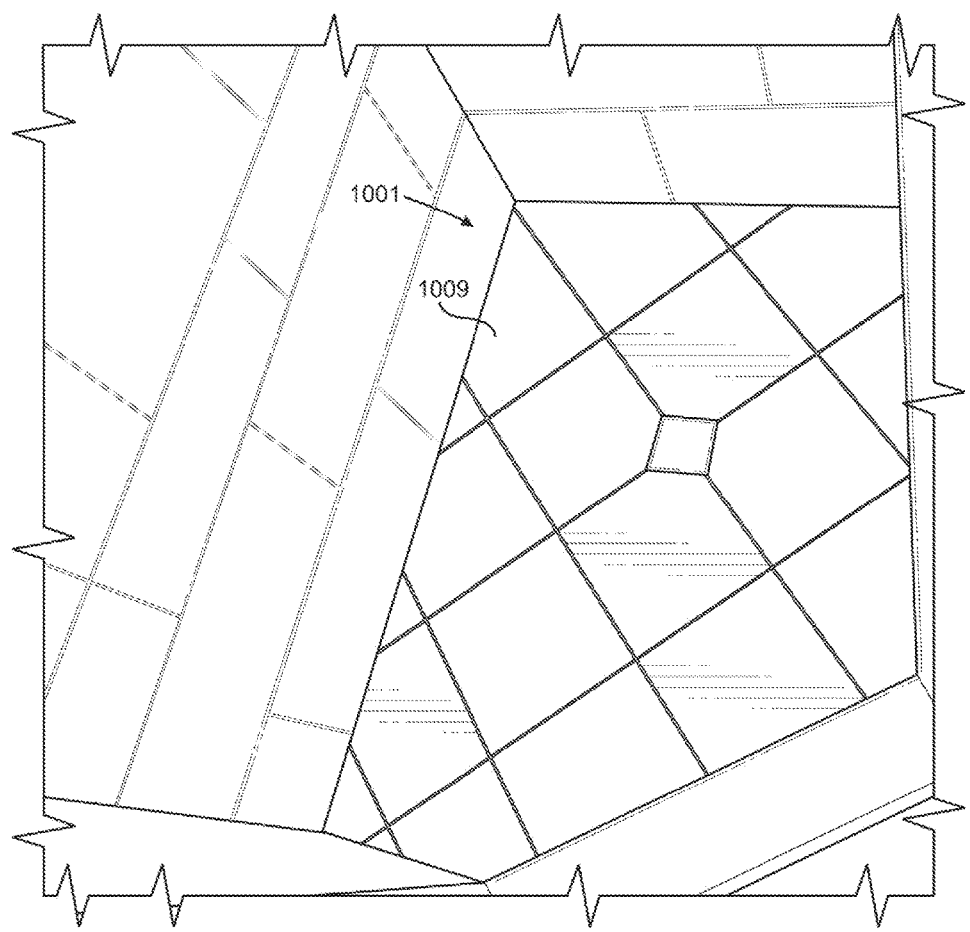
Figure 11A:
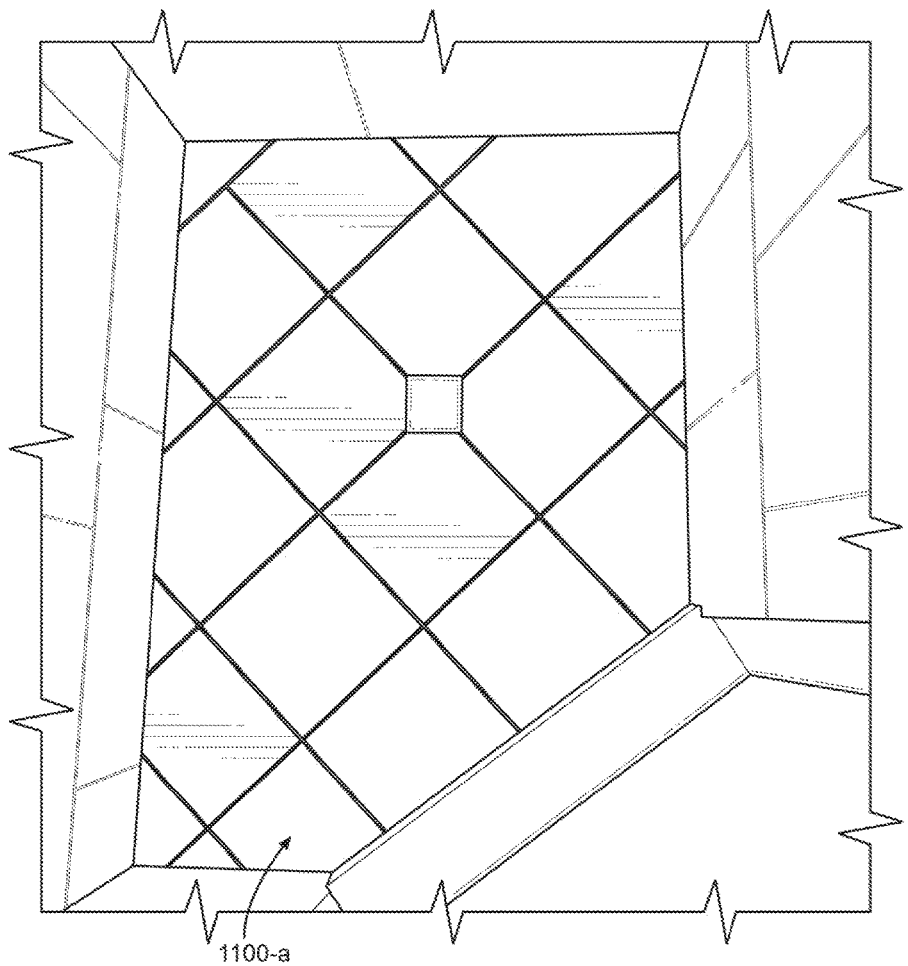
FIGS. 11A-11F show various examples of finished showers installed and tiled using a frame for creating a pre-slope, according to an aspect.
Figure 11B:
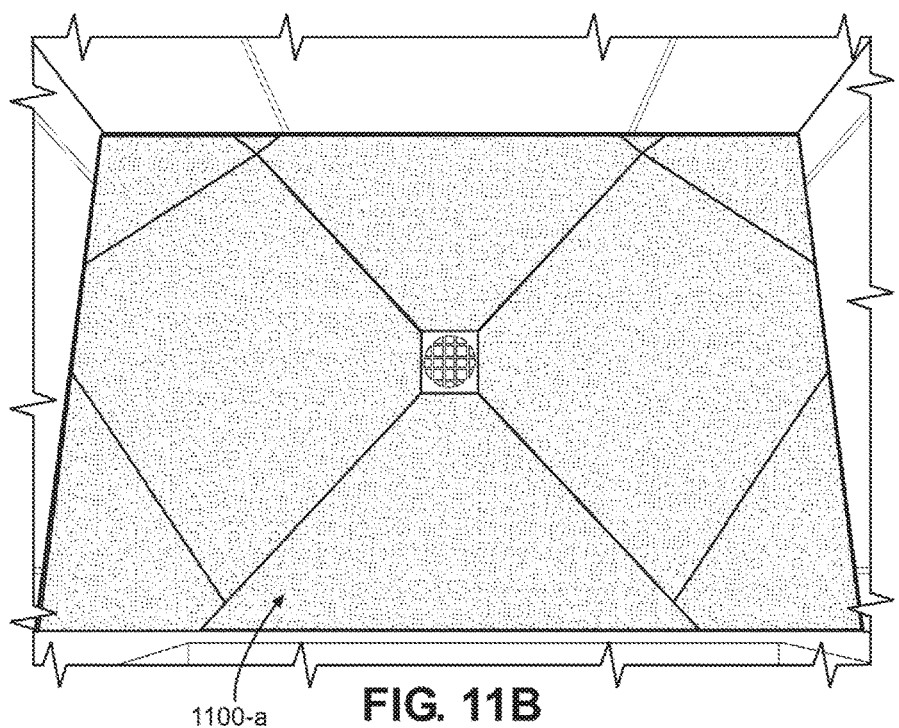
Figure 11C:
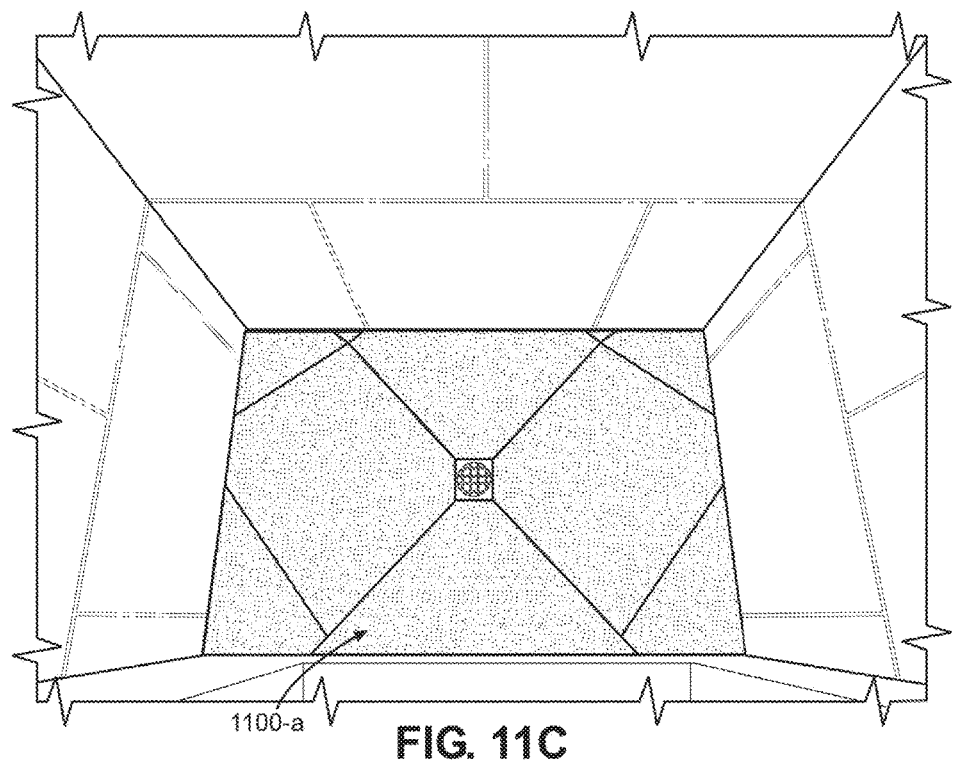
Figure 11D:
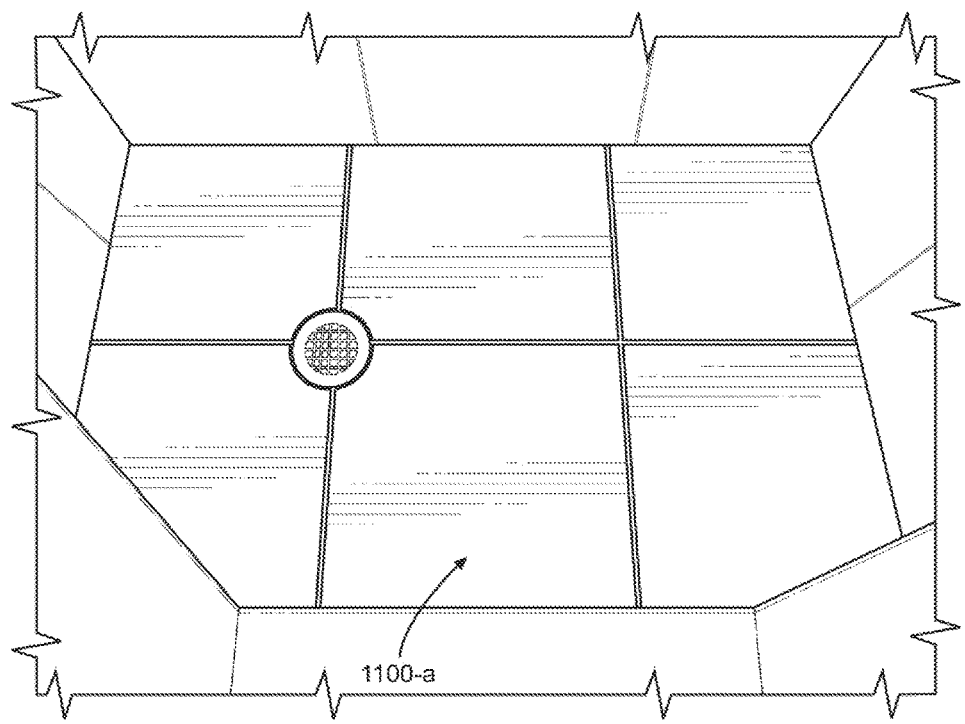
Figure 11E:
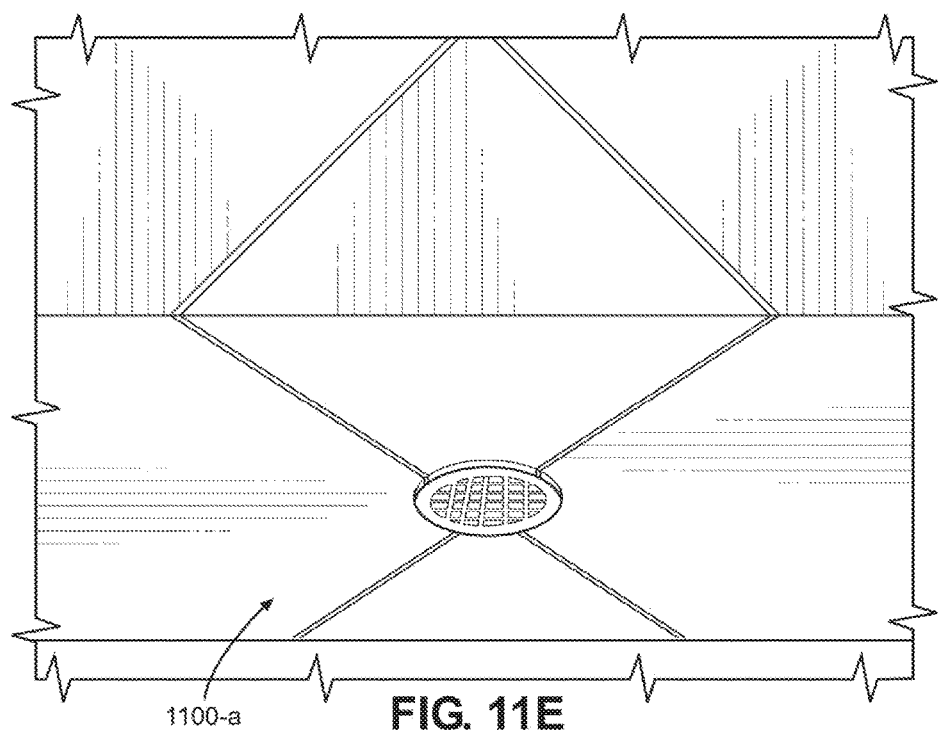
Figure 11F:
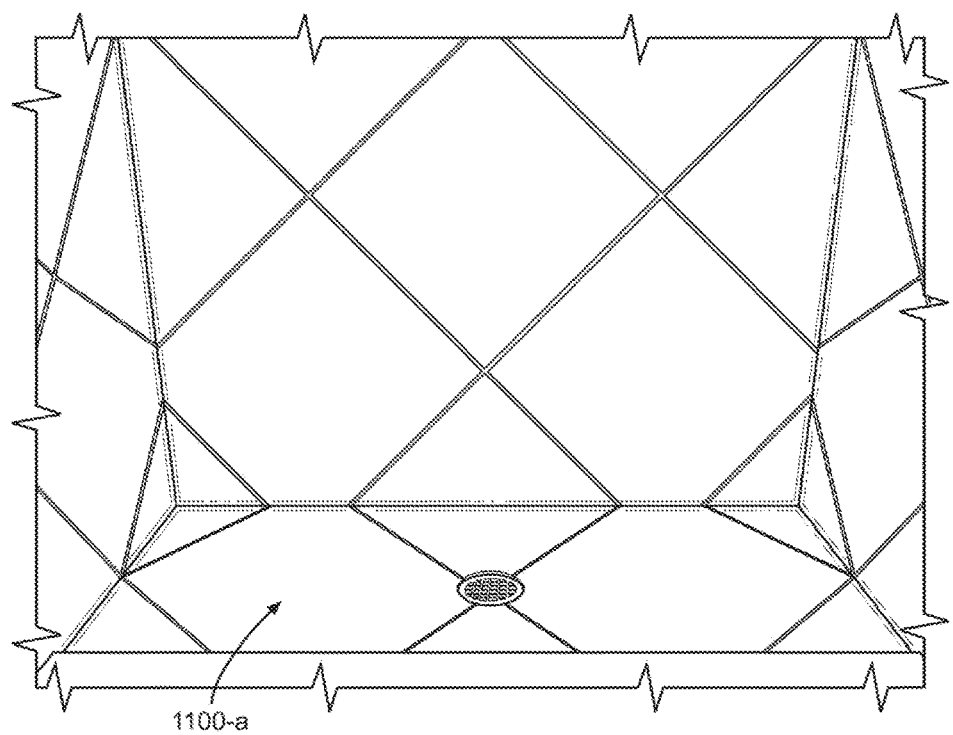

FIGS. 10A-10B show step 8 of an exemplary method, showing the top perspective view of installing tiles in a shower floor 1001, according to an aspect. Once the pre-slope has been formed by the frame 1000, and a mortar has been applied atop the frame 1000 or below and atop the frame 1000, tiles 1009 may be installed on top of the pre-slope, as known in the art. Guides such as number markers may be used for the placement and installation of tiles, as shown in FIGS. 8A-8B. Installation of the tiles may be performed through any process known in the art. FIG. 10B shows an example of a nearly complete shower tiling process, with the frame underneath the tiles 1009 no longer visible.

FIGS. 11A-11F show various examples of finished showers installed and tiled using a frame for creating a pre-slope, according to an aspect. As shown by 1100-a, the finished tiled floors 1100-a of the showers may be sloped such that water pooling is prevented, and water can quickly flow towards the drain.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A frame having a slope for supporting tiles of a shower floor, the frame comprising:
   a plurality of slats in a lattice grid formation;
   a higher portion and a lower portion creating the slope;
   a plurality of guide rails configured to hold the tiles in place at a uniform level with each other tile and following the slope when placed onto the frame;
   a drain hole at the lower portion, the drain hole aligning with a drain of the shower floor;
   the slope of the frame and the tiles allowing water to flow from the higher portion to the lower portion towards the drain and quickly drain the water into the drain, thus preventing accumulation of the water on the shower floor.

2. The frame of claim 1, wherein the frame is comprised of a plurality of frame pieces, at least a first frame piece of the plurality of frame pieces having a post and at least a second frame piece of the plurality of frame pieces having a hole for receiving the post, for connection of the frame pieces together into a single unit.

3. The frame of claim 2, wherein the plurality of frame pieces further comprises means for locking the plurality of frame pieces together.

4. The frame of claim 2, wherein the plurality of frame pieces is four frame pieces.

5. The frame of claim 1, wherein the frame is a single integral unit.

6. The frame of claim 1, wherein the drain hole is centered within the frame.

7. The frame of claim 1, the frame having a top side and a bottom side and further comprising supports on the bottom side such that a gap is provided between the shower floor and the frame when the frame is installed onto the shower floor.

8. A method of tiling a shower floor using a frame having a slope for supporting tiles, the frame comprising a plurality of slats in a grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor; the method comprising the steps of:
   measuring the dimensions of the shower floor;
   lining the shower floor with a waterproof shower pan liner;
   providing the frame, sized to match the measured dimensions of the shower floor;
   installing the frame having a slope onto the waterproof shower pan liner;
   aligning the slope with the drain of the shower floor, such that the drain hole is positioned substantially near the drain;
   positioning the tiles on the frame, at least some of the tiles aligning with the guide rails;
   marking positions of the tiles relative to each other on the frame;
   removing the tiles from the frame;
   laying down a substrate for adhering the tiles to the frame; and
   installing tiles on top of the frame according to the marked positions.

9. The method of claim 8, wherein the frame is comprised of a plurality of frame pieces, at least a first frame piece of the plurality of frame pieces having a post and at least a second frame piece of the plurality of frame pieces having a hole for receiving the post, for connection of the frame pieces together into a single unit.

10. The method of claim 9, wherein the plurality of frame pieces further comprises means for locking the plurality of frame pieces together.

11. The method of claim 8, wherein the frame is a single integral unit.

12. The method of claim 8, wherein the drain hole is centered within the frame.

13. The method of claim 8, the frame having a top side and a bottom side and further comprising supports on the bottom side such that a gap is provided between the shower floor and the frame when the frame is installed onto the shower floor.

14. A method of making a frame having a slope for supporting tiles of a shower floor, the frame comprising a plurality of slats in a grid formation; a higher portion and a lower portion creating the slope; a plurality of guide rails configured to hold the tiles in place at a uniform level with each other and following the slope when placed onto the frame; a drain hole at the lower portion, the drain hole aligning with a drain of the shower floor; the slope of the frame and the tiles allowing water to flow from the higher portion to the lower portion towards the drain and quickly drain the water into the drain, thus preventing accumulation of the water on the shower floor; the method comprising the steps of:

measuring dimensions of the shower floor;

marking a position of a drain within the dimensions of the shower floor;

providing the frame;

cutting the frame to match the measured dimensions;

cutting a drain hole into the frame at the marked position of the drain, the drain hole being sized to fit substantially around the drain;

aligning the slope with a drain of the shower floor, such that a pre-slope is created in the shower floor;

cutting the frame into a plurality of frame pieces;

attaching a post to at least a first frame piece of the plurality of frame pieces;

cutting a hole for receiving the post in at least a second frame piece of the plurality of frame pieces; and installing a locking means in the second frame piece such that the first frame piece is locked into the second frame piece when received into the second frame piece.

15. The method of claim 14, the frame having a top side and a bottom side and further comprising the step of:

attaching supports on the bottom side such that a gap is provided between the shower floor and the frame when the frame is installed onto the shower floor.

16. The method of claim 14, wherein the plurality of frame pieces is four frame pieces.

* * * * *